United States Patent [19]

Burris et al.

[11] Patent Number: 4,536,172

[45] Date of Patent: Aug. 20, 1985

[54] BELT TENSIONER AND METHOD OF MAKING THE SAME

[75] Inventors: Lee R. Burris, Porter Township, Dade County; Billy L. Speer, Springfield; Melvin D. Gayer, Rock Prairie Township, Dade County, all of Mo.

[73] Assignee: Dayco Corporation, Dayton, Ohio

[21] Appl. No.: 581,645

[22] Filed: Feb. 21, 1984

[51] Int. Cl.³ .............................................. F16H 7/08
[52] U.S. Cl. ..................................... 474/135; 474/139
[58] Field of Search ................ 474/117, 138, 133–135, 474/101, 115, 139, 148; 188/307

[56] References Cited

U.S. PATENT DOCUMENTS

| | | | |
|---|---|---|---|
| 2,790,520 | 4/1957 | Kuhn, Jr. .............................. | 188/307 |
| 4,270,906 | 6/1981 | Kraft et al. ........................... | 474/135 |
| 4,464,147 | 8/1984 | Foster .................................. | 474/135 |
| 4,472,162 | 9/1984 | Hitchcock ............................ | 474/135 |
| 4,473,362 | 9/1984 | Thomey et al. ...................... | 474/135 |

*Primary Examiner*—Stephen J. Novosad
*Assistant Examiner*—Thuy M. Bui
*Attorney, Agent, or Firm*—Joseph V. Tassone

[57] ABSTRACT

A tensioner for a power transmission belt that is adapted to be operated in an endless path and a method of making the same are provided, the tensioner comprising a mechanical spring unit operatively associated with a support unit and a belt engaging unit for urging the belt engaging unit relative to the support unit and against a belt with a force to tension the belt, and a fluid dampening unit operatively associated with the support unit and the belt engaging unit to dampen the movement of the belt engaging unit relative to the support unit in at least one direction of movement thereof, the fluid dampening unit comprising a rotary dampening unit and being coaxially aligned with the spring unit. The rotary dampening unit comprises an outer ring member and an inner ring member disposed in the outer ring member with the members being arranged for relative rotational movement therebetween, the outer ring member being operatively interconnected to the support unit and the inner ring member being operatively interconnected to the belt engaging unit. The support unit comprises a cup-shaped housing containing the spring unit therein and having a closed end and an open end, the housing being operatively interconnected to the outer ring member. Part of the open end of the housing extends over the outer ring member and is secured thereto.

20 Claims, 12 Drawing Figures

BELT TENSIONER AND METHOD OF MAKING THE SAME

BACKGROUND OF THE INVENTION

1. Field of the Invention

This invention relates to an improved tensioner for an endless power transmission belt or the like and to a method of making such a tensioner.

2. Prior Art Statement

It is known to applicants to provide a tensioner for a power transmission belt that is adapted to be operated in an endless path, the tensioner comprising a support means for being fixed relative to the belt, a belt engaging means carried by the support means and being movable relative thereto, mechanical spring means operatively associated with the support means and the belt engaging means for urging the belt engaging means relative to the support means and against the belt with a force to tension the belt, and fluid dampening means operatively associated with the support means and the belt engaging means to dampen the movement of the belt engaging means relative to the support means in at least one direction of movement thereof, the fluid dampening means comprising a rotary dampening means, the rotary dampening means and the spring means being coaxially aligned, the rotary dampening means comprising an outer ring member and an inner ring member disposed in the outer ring member, the members being arranged for relative rotational movement therebetween, the outer ring member being operatively interconnected to the support means, the inner ring member being operatively interconnected to the belt engaging means, the support means comprising a cup-shaped housing means containing the spring means therein and having a closed end means and an open end means, the housing means being operatively interconnected to the outer ring member. For example, see the copending patent application Ser. No. 427,074, filed Sept. 29, 1982 of Randy C. Foster wherein a tubular member is interconnected to the closed end of the cup-shaped housing for the spring means and has an outer end interconnected to the outer ring member to operatively interconnect the outer ring member of the rotary dampening means to the support means.

It is also known to secure a belt tensioner to a vehicle bracket by a single bolt passing through an opening in the support means of the tensioner so that the tensioner can be mounted from the front side thereof. For example, see the aforementioned U.S. patent application, Ser. No. 427,074, filed Sept. 29, 1982 and the U.S. patent to Kraft et al, U.S. Pat. No. 4,270,906.

It is also known to applicants to utilize opposed edges of the housing means for a spring means of a tensioner as stop means for limiting pivoting movement of the belt engaging means relative to the support means thereof. For example, see the copending patent application, Ser. No. 391,643, filed June 25, 1982 of Randy C. Foster.

SUMMARY OF THE INVENTION

It is one feature of this invention to provide a tensioner having improved means for operatively interconnecting the outer ring member of a rotary dampener thereof to the support means thereof.

In particular, it was found according to the teachings of this invention that the tensioner as set forth in the aforementioned copending patent application Ser. No. 427,074, filed Sept. 29, 1982 of Randy C. Foster required a plurality of parts in order to permit the same to be mounted to a vehicle bracket by a single bolt passing through an opening in the support means thereof while at the same time having the cup-shaped housing of the support means that contains the spring means therein be operatively interconnected to the outer ring member of the rotary dampening means thereof by the same tubular member that defines the opening for receiving the single mounting bolt.

Accordingly, it was found according to the teachings of this invention that the tubular member of the cup-shaped housing means could still be utilized for providing the opening means for the single mounting bolt and that the open end of such housing means could be modified in a unique manner to permit the same to be directly interconnected to the outer ring member of the rotary dampening means so that the outer ring member of the rotary dampening means would be operatively interconnected to the support means.

For example, one embodiment of this invention provides a tensioner for a power transmission belt that is adapted to be operated in an endless path, the tensioner comprising a support means for being fixed relatives to said belt, a belt engaging means carried by the support means and being movable relative thereto, mechanical spring means operatively associated with the support means and the belt engaging means for urging the belt engaging means relative to the support means and against the belt with a force to tension the belt, and fluid dampening means operatively associated with the support means and the belt engaging means to dampen the movement of the belt engaging means relative to the support means in at least one direction of movement thereof. The fluid dampening means comprises a rotary dampening means, the rotary dampening means and the spring means being coaxially aligned. The rotary dampening means comprises an outer ring member and an inner ring member disposed in the outer ring member, the members being arranged for relative rotational movement therebetween. The outer ring member is operatively interconnected to the support means and the inner ring member is operatively interconnected to the belt engaging means, the support means comprising a cup-shaped housing means containing the spring means therein and having a closed end means and an open end means. The housing means is operatively interconnected to the outer ring member. Part of the open end means of the housing means extends over the outer ring member and is secured thereto.

Accordingly, it is an object of this invention to provide an improved tensioner for a power transmission belt or the like that is adapted to be operated in an endless path, the tensioner of this invention having one or more of the novel features of this invention as set forth above or hereinafter shown or described.

Another object of this invention is to provide an improved method of making such a tensioner, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
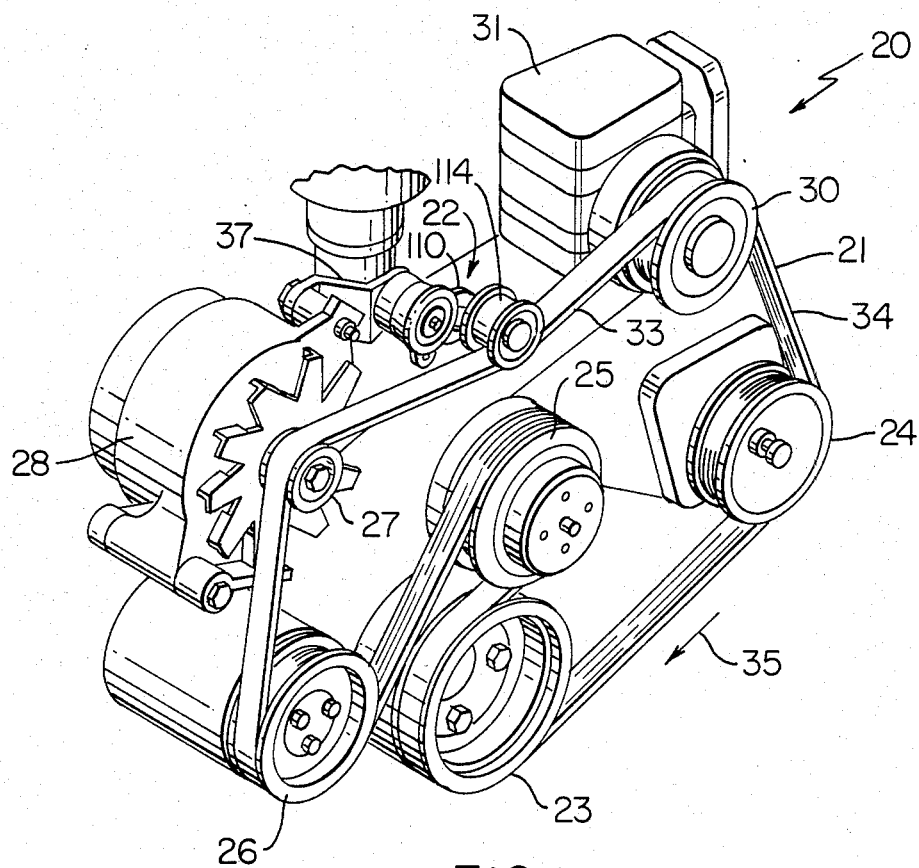
FIG. 1 is a fragmentary isometric view looking toward the front end of an automobile engine which utilizes the belt tensioner of this invention.

While the various features of this invention are hereinafter illustrated and described as providing a belt tensioner for a particular power transmission belt of a particular motor vehicle engine, it is to be understood that the various features of this invention can be utilized singly or in any combination thereof to provide a belt tensioner for other arrangement as desired.

Therefore, this invention is not to be limited to only the embodiment illustrated in the drawings, because the drawings are merely utilizezd to illustrate one of the wide variety of uses of this invention.

Figure 2:
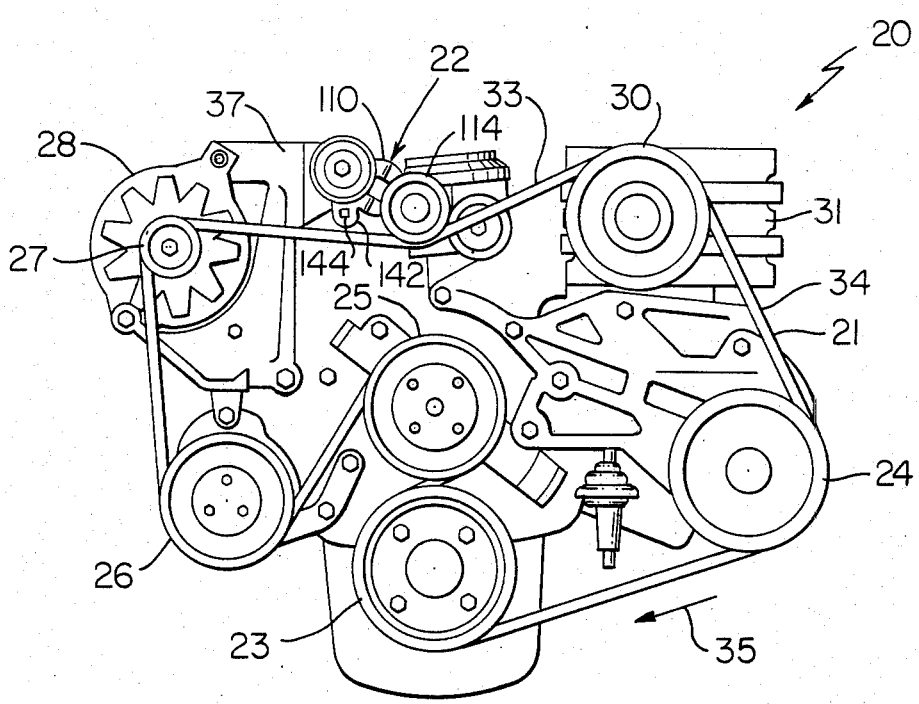
FIG. 2 is a view looking perpendicularly toward the front end of the automobile engine of FIG. 1.

Referring now to FIGS. 1 and 2, an automobile engine is generally indicated by the reference numeral 20 and utilizes an endless power transmission belt 21 for driving a plurality of driven accessories as hereinafter set forth, the improved belt tensioner of this invention being generally indicated by the reference numeral 22 and being utilized to provide a tensioning force on the belt 21 in a manner hereinafter set forth.

The endless power transmission belt 21 may be of any suitable type known in the art and is preferably made primarily of a polymeric material because the unique features of the tensioner 22 of this invention readily permit the tensioner 22 to tension a belt having a polyester load-carrying cord in an efficient manner as hereinafter described.

The belt 21 is driven by a driving sheave 23 which is operatively interconnected to the crankshaft of the engine 20 in a manner well known in the art. The driving sheave 23 drives the belt 21 in an endless path and thereby drives a sheave 24 of a power steering device used in an automobile (not shown) utilizing the engine 20, a sheave 25 of an engine water pump, a sheave 26 of an air pump of a type used in an antipollution system for the engine 20, a sheave 27 of an engine electrical alternator 28, and a sheave 30 of a compressor 31 of an air conditioning system for the automobile utilizing the engine 20.

All of the driven accessories, through their sheaves 24, 25, 26, 27 and 30, impose a load on the belt 21. However, only the detailed description of the load being imposed by the compressor 31 and its sheave 30 on the belt 21 will be hereinafter described inasmuch as such load is generally of a comparatively high magnitude.

In particular, the compressor 31, upon being driven, creates a slack side 33 and a tight side 34 in the belt 21 upon turning on of the air conditioner system in the automobile, the slack side 33 and tight side 34 being produced since the belt is rotating clockwise as indicated by the arrow 35 in FIGS. 1 and 2.

The belt tight side 34 (and hence, slack side 33) varies in tightness, i.e., magnitude of tightness, in a cyclic manner and as a function of the inherent cyclic change in the loads imposed by the air compressor 31. This cyclic change and load varies between greater extremes in applications where the compressor 31 is of a piston type. The cyclic load imposed by the compressor 31 has a tendency to cause the slack side 33 of the belt 21 to vibrate or oscillate.

In addition to such vibrations and oscillations of the belt 21, it is known that normal belt wear and heat variations in the engine compartment for the engine 20 produce variations in the length of the belt 21 that require compensation for the same.

Thus, it is known that it is difficult to maintain such a belt 21 under tension with a force required to insure non-slipping engagement and driving of the driven sheaves whereby numerous belt tensioners have been proposed and used heretofore in an effort to provide the required tension.

It is believed that the improved belt tensioner 22 of this invention functions in a manner to provide a proper tensioning force on the belt 21 to overcome the aforementioned problems, namely, provides the required tension in the overall belt 21 as well as prevents any tendency of the belt to oscillate in an undesirable manner as a result of the cyclic load change imposed by the compressor 31 whereby the improved belt tensioner 22 of this invention will now be described.

Figure 5:
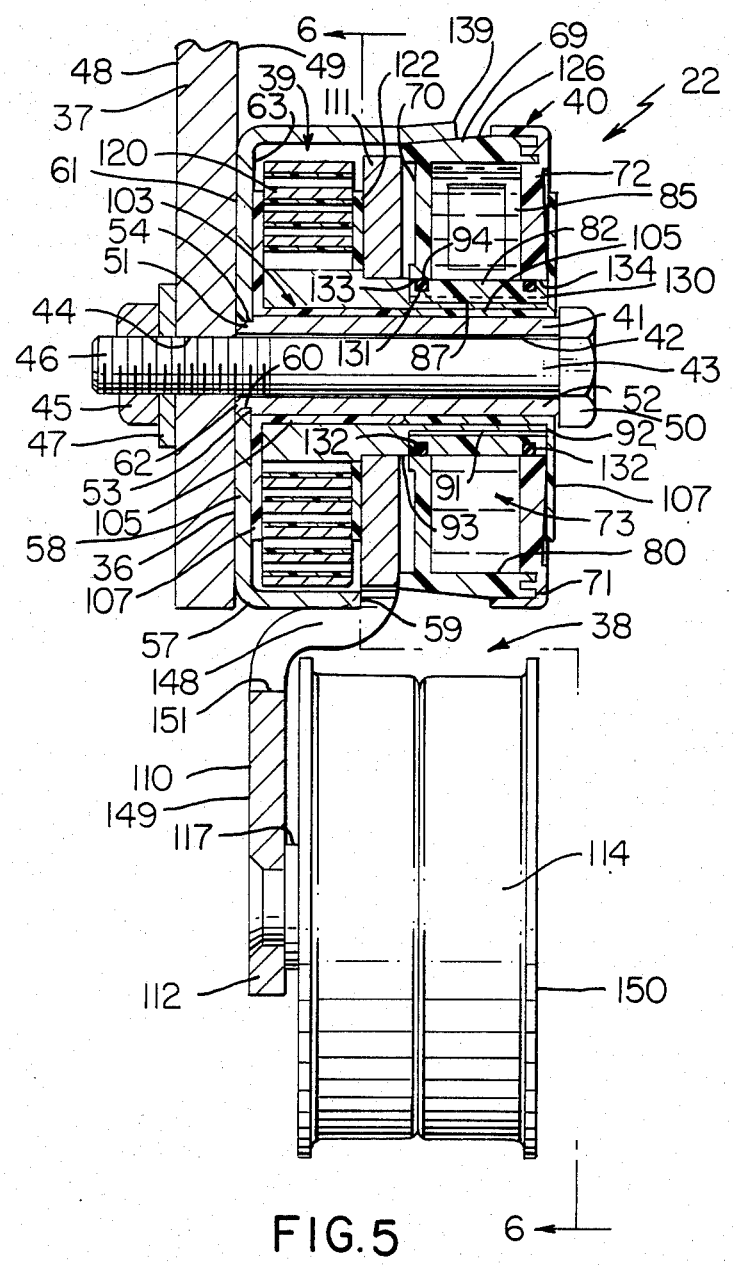
FIG. 5 is a fragmentary cross-sectional view of the belt tensioner of FIG. 3 and is taken on line 5—5 of FIG. 3.
Figure 9:
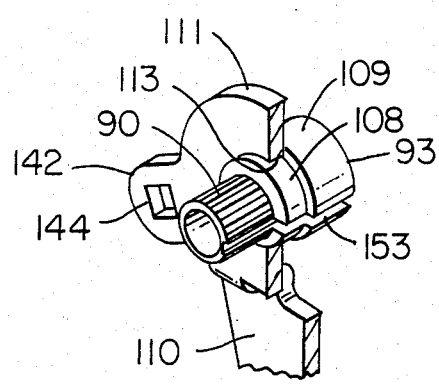
FIG. 9 is a fragmentary perspective view of part of the belt engaging means of the belt tensioner of this invention.

As best illustrated in FIG. 5, the improved belt tensioner 22 of this invention comprises a support means 36 adapted to be fixed to a mounting bracket 37 of the engine 20 as illustrated in FIGS. 1 and 2. A belt engaging means that is generally indicated by the reference numeral 38 is movably carried by the support means 36 in a manner hereinafter set forth. The tensioner 22 has mechanical spring means that is generally indicated by the reference numeral 39 operatively associated with the support means 36 and belt engaging means 38 to tend to urge the belt engaging means 38 against the slack side 33 of the belt 21.

The belt tensioner 22 also includes a fluid dampening means that is generally indicated by the reference numeral 40 and is operatively associated with the support means 36 and the belt engaging means 38 to dampen movement of the belt engaging means 38 relative to the support means 36 in a manner hereinafter set forth.

The fluid dampening means 40 and spring means 39 are coaxially aligned and the support means 36 includes a tubular member 41 that has a cylindrical opening 42 passing completely therethrough to receive a fastening bolt 43 that is adapted to fasten the tensioner 22 to the bracket 37 by passing through an opening 44 in the bracket 37 and having a nut 45 threaded on the threaded end 46 thereof to compact a washer 47 against the rear side 48 of the bracket 37 while one end 51 of the tubular member 41 is being compacted against the front side 49 of the bracket 37 by the enlarged head 50 of the bolt or fastening member 43 engaging against the other end 52 of the tubular member 41.

In this manner, the tensioner 22 of this invention is adapted to be mounted to the bracket 37 by the single bolt 43 that is inserted through the fastening opening 42 at the front of the tensioner 22, the fastening opening 42 being coaxially disposed through the coaxially aligned fluid dampening means 40 and spring means 39 to render the tensioner 22 relatively small and compact.

As best illustrated in FIG. 5, the tubular member 41 has the end 51 thereof defining an annular shoulder 53 with a reduced portion 54 extending from the shoulder 53.

A cup-shaped housing member 57 has a closed end 58 and an open end 59, the closed end 58 having an opening 60 passing therethrough and being adapted to receive the reduced portion 54 of the end 51 of the tubular member 41 therethrough so that the reduced end 54 can be subsequently turned over or staked to the side 61 of the housing 57, the staked portion of the end 51 of the tubular member 41 being indicated by the reference numeral 62 whereby the housing 57 has its side 63 held against the shoulder 53 of the tubular member 41 by the staking 62 so that the housing 57 is fixed to the tubular member 41 and defines part of the support means 36 of the tensioner 22 of this invention as will be apparent hereinafter. Of course, the end 51 of the tubular member 41 could be secured to the closed end wall 58 of the housing member 57 in any other suitable manner, as desired.

Figure 4:
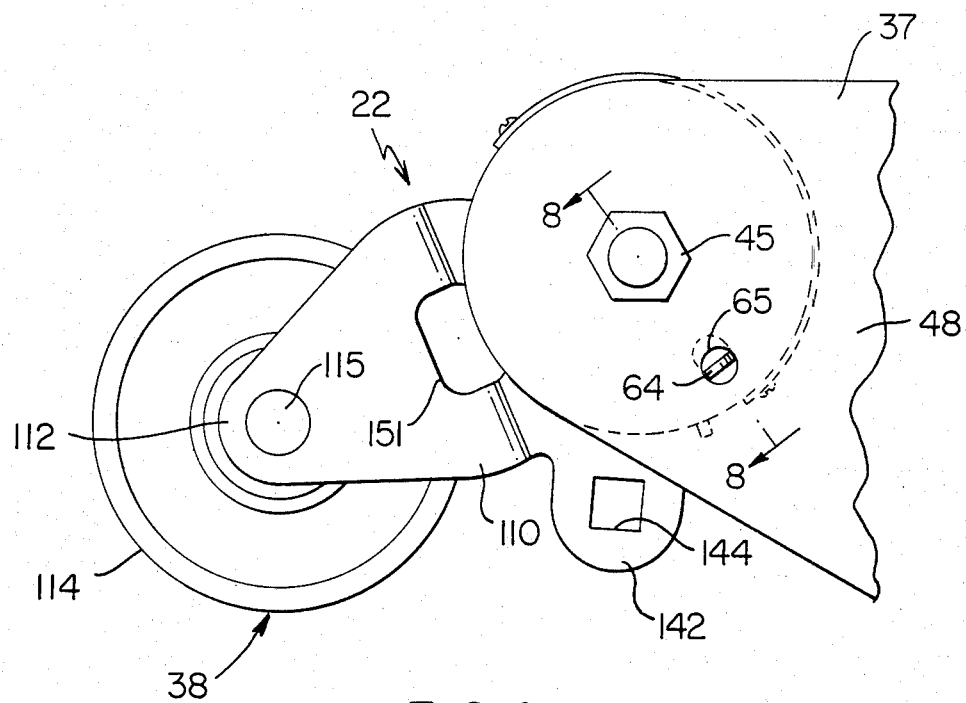
FIG. 4 is a fragmentary rear view of the belt tensioner of FIG. 3.
Figure 8:
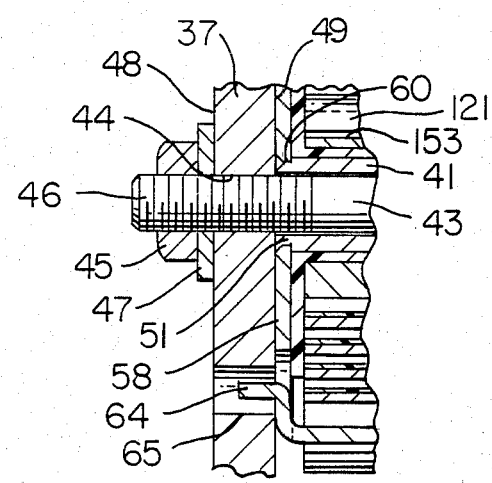
FIG. 8 is a fragmentary cross-sectional view of the tensioner of FIG. 4 and is taken on line 8—8 of FIG. 4.

When the tensioner 22 is subsequently mounted to the vehicle bracket 37 by the single fastening member or bolt 43 in the manner previously described, rotation of the support means 36 relative to the bracket 37 is prevented by a tang 64 that had been carved from the closed end 58 of the housing 57 and that projects into a suitable locating opening 65 in the bracket 37 as illustrated in FIGS. 4 and 8 whereby the housing 57 is prevented from rotating relative to the bracket 37 and, thus, prevents the tubular member 41 from rotating relative thereto as the tubular member 41 is fastened to the housing 57 by the aforementioned staking 62.

Figure 10:
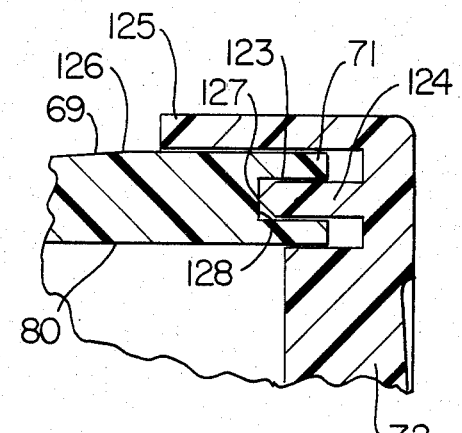
FIG. 10 is an enlarged fragmentary cross-sectional view illustrating one of the steps in the method of this invention for making the rotary dampening means of the belt tensioner of this invention.
Figure 11:
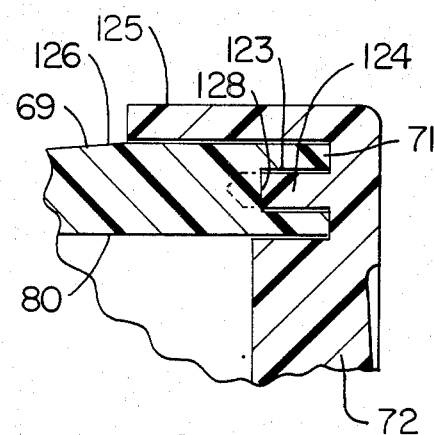
FIG. 11 is a view similar to FIG. 10 and illustrates another step in the method of making the rotary dampening means.

The fluid dampening means 40 includes an outer ring member 69 which comprises a cup-shaped member having a closed end 70 and an open end 71, the open end 71 of the casing or outer ring member 69 being adapted to be closed by a cover member 72 secured thereto. For example, the outer ring member 69 and the cover member 72 comprise plastic material, and the same can be ultrasonically welded together in a manner well known in the art as illustrated in FIGS. 10 and 11 to define a sealed chamber 73 within the outer ring member 69 for a purpose hereinafter described. In any event, once the cover 72 is secured to the cup-shaped outer ring member 69, the cover 72 cannot move relative to the outer ring member 69.

The outer ring member 69 of the fluid dampening means 40 has a pair of diametrically disposed vanes 79 extending radially inwardly from the internal cylindrical peripheral surface 80 of the outer ring member 69, the vanes 79 respectively being provided with free ends 81 for a purpose hereinafter described.

An inner ring member 82 is adapted to be disposed in the chamber 73 of the outer ring member 69 and comprises a tubular portion 83 having a substantially cylindrical outer peripheral surface 84 and a pair of diametrically disposed vanes 85 radiating outwardly therefrom, each vane 85 being provided with an outer free end 86.

The tubular portion 83 of the inner ring member 82 has a cylindrical opening 87 passing therethrough and defining an internal peripheral surface 88 thereof that has a set of splines or ribs 89 adapted to mesh with like splines or ribs 90 formed in the outer peripheral cylindrical surface 91 of a projection 92 of an arbor sleeve or member 93 adapted to project into the opening 87 of the inner ring member 82 but also to pass through a central opening 94 formed through the closed end 70 of the outer ring member 69. In this manner, the inner ring member 82 will be mounted concentrically within the chamber 73 of the outer ring member 69, the projection 92 of the arbor sleeve 93 being fastened to the inner ring member 82 so as to rotate in unison therewith by the meshing ribs 89 and 90 of the inner ring member 82 and arbor sleeve 93.

However, it is to be understood that the inner ring member 82 can be interconnected to the projection 91 of the arbor sleeve 93 in any other desired manner.

In any event, it can be seen that the inner ring member 82 is fixed to the arbor sleeve 93 so as to rotate in unison therewith and since the outer ring member 69 is held from rotation by the housing 57 of the support means 36 in a manner hereinafter set forth, the inner ring member 82 is adapted to move relative thereto.

Figure 7:
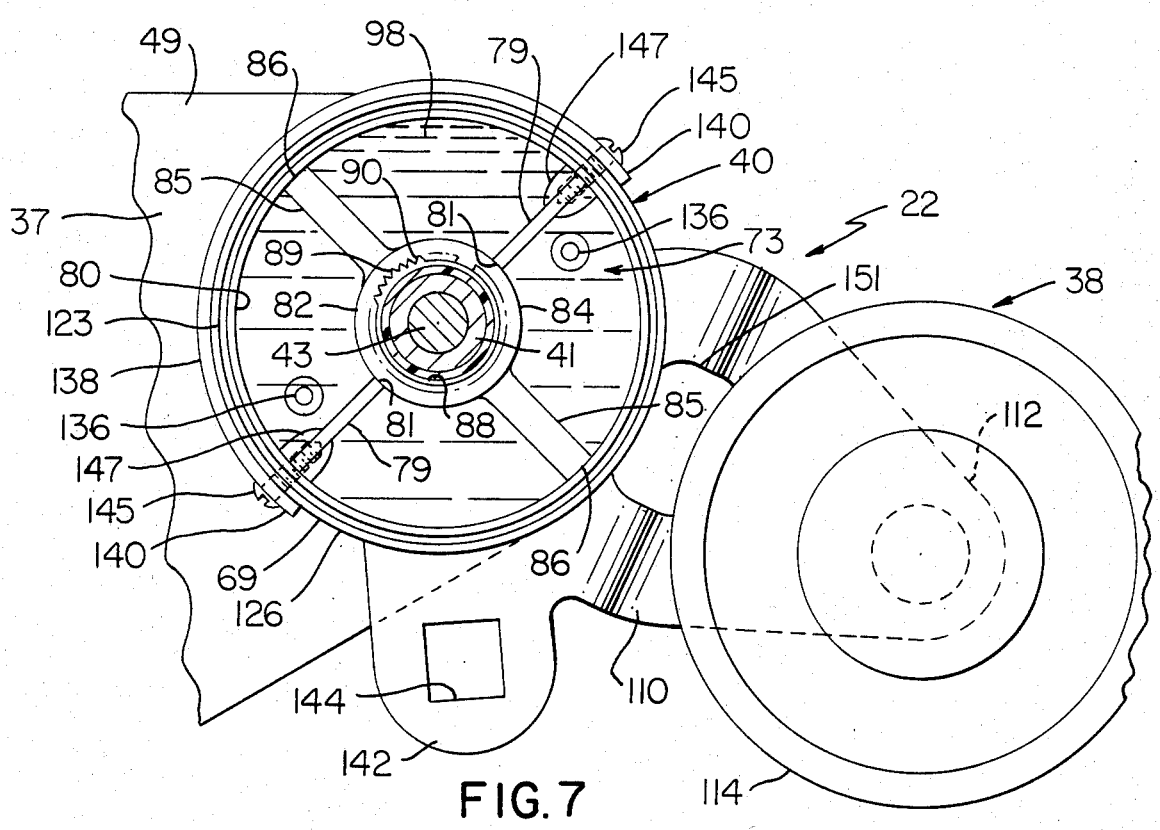
FIG. 7 is a fragmentary cross-sectional view of the tensioner of FIG. 5 and is taken on line 7—7 of FIG. 5.

As illustrated in FIG. 7, the inner ring member 82 has its vanes 85 disposed intermediate the vanes 79 of the outer ring member 69 and when the chamber 73 is filled with a suitable fluid, such as suitable hydraulic oil, grease, air or other suitable fluid medium, any rotation of the inner ring member 82 relative to the outer ring member 69 will cause its vanes 85 to act on the fluid, indicated by the reference numeral 98 in FIG. 7 to tend to retard such movement whereby the rotary dampening means 40 of this invention will provide a dampening effect on the movement of the belt engaging means 38 relative to the belt 21 in a manner hereinafter set forth and as fully set forth in the copending patent applications, Ser. No. 427,074, filed Sept. 29, 1982 and Ser. No. 391,643, filed June 25, 1982 and U.S. Pat. No. 4,413,982 whereby these two patent applications and this patent are being incorporated into this disclosure by this reference thereto.

In order to control the amount of fluid flow past the vanes 85 and 79 of the inner ring member 82 and outer ring member 69 during the aforementioned movement of the inner ring member 82 relative to the outer ring member 69, the free ends 81 of the vanes 79 can be disposed closely adjacent the outer cylindrical surface 84 of the inner ring member 82 while the outer ends 86 of the vanes 85 of the inner ring member 82 can be disposed closely adjacent the internal peripheral surface 80 of the outer ring member 69. In fact, the outer free ends 81 and 86 of the vanes 79 and 85 can have sealing means respectively disposed in sealing engagement with the tubular portion 83 of the inner ring member 82 and the inner peripheral surface 80 of the outer ring member 69, if desired.

A bearing-like tubular sleeve means 103 is adapted to be disposed in a cylindrical opening 104 passing through the arbor sleeve 93 so that the tubular sleeve means 103 will rotatably mount the arbor sleeve 93 on the tubular member 41 of the support means 36.

In particular, the sleeve means 103 comprises a pair of like cylindrical members 105 formed of any suitable bearing material, such as polymeric material, and having cylindrical openings 106 passing therethrough, each member 105 having a disc-like end 107 and being beveled at the other end thereof to facilitate insertion of the members 105 in the opposed ends of the arbor member 93 as illustrated in FIG. 5.

In this manner, the sleeve means 103 provides a bearing means on the stationary tubular member 41 as will be apparent hereinafter.

The arbor sleeve 93 has an intermediate cylindrical portion 108 and an outer cylindrical portion 109 with the portions 108 and 109 respectively forming part of the belt engaging means 38 and the spring means 39.

In particular, the belt engaging means 38 includes an arm 110 having opposed ends 111 and 112, the end 111 having a cylindrical opening 113 passing therethrough and receiving the intermediate cylindrical section 108 of the arbor sleeve 93 therein, the cylindrical section 108 being secured in the opening 113 in any suitable manner, such as by copper brazing or the like, so that the arm 110 and arbor sleeve 93 are effectively interconnected together and will rotate in unison. The other end 112 of the arm 110 carries a rotatable pulley 114 that is rotatably mounted on a shaft 115 having an end fixed in an opening 117 in the end 112 of the arm 110 in any suitable manner, the pulley 114 being held on the shaft 115 by a suitable C-ring 118 being received in an annular groove 119 in the shaft 115 so that the pulley 114 is confined for rotation on the shaft 115 between the C-ring 118 and the end 112 of the arm 110. If desired a suitable dust cover 116 can be utilized as illustrated.

In this manner, movement of the pulley 114 through the positions illustrated in FIG. 3 will cause the arm 110 to move therewith and thereby cause rotation of the arbor sleeve 93 which in turn causes rotation of the inner ring member 82 of the fluid dampening means 40 to provide a dampening force on such movement of the pulley 114 as will be apparent hereinafter.

The spring means 39 of the tensioner 22 of this invention comprises a coiled spring 120 having opposed inner and outer ends 121 and 152. The inner end 121 of the coiled torsion spring 120 is adapted to be received in a slot 153 formed in the outer peripheral surface 154 of the portion 109 of the arbor sleeve 93 as illustrated in FIG. 6 while the outer end 152 of the torsion spring 120 is formed in a hook shape so that the resulting hook 155 thereof hooks over the edge 156 of the housing 57 at an opening means 157 thereof.

Figure 3:
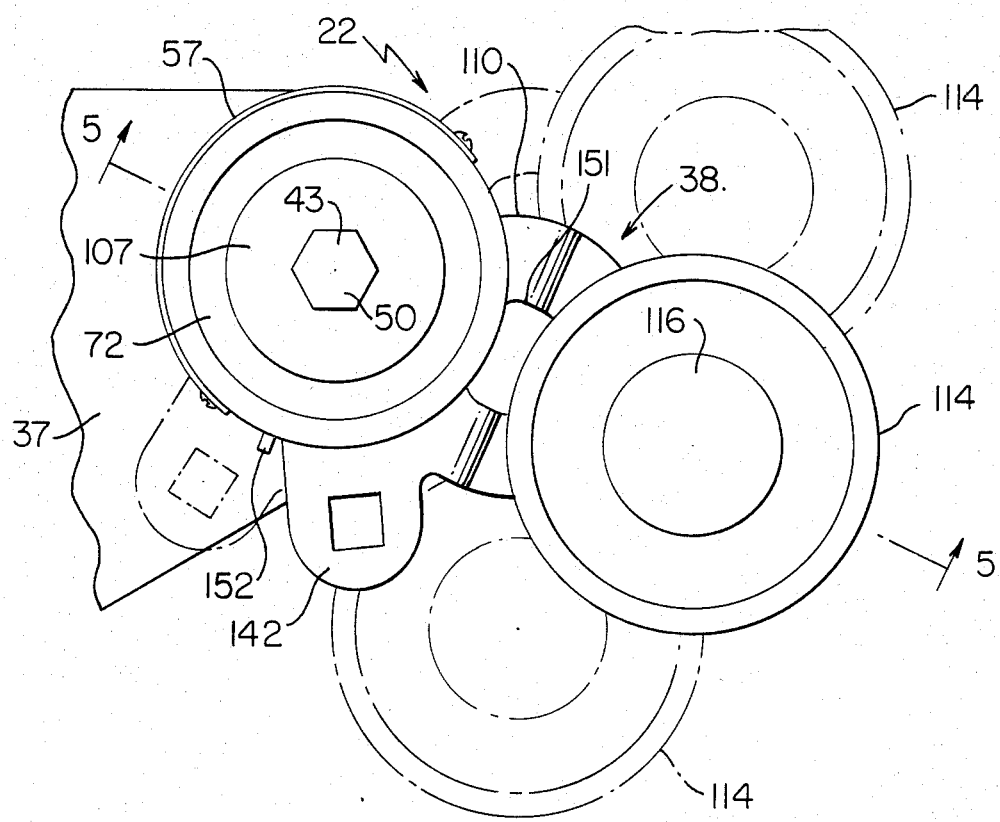
FIG. 3 is an enlarged fragmentary front view of the belt tensioner of this invention that is being utilized for tensioning the power transmission belt of FIGS. 1 and 2 and illustrates various positions thereof.

The torsion spring 120 is so arranged in the housing 57 of the tensioner 22, that the spring 120 has a force tending to move the arbor sleeve 93 in a direction to tend to cause the arm 110 to move the pulley 114 in a clockwise direction from the positions of the arm 110 illustrated in FIG. 3 whereby when the pulley 114 is disposed in any of the positions illustrated in FIG. 3, the torsion spring 120 is wound up so that the spring 120 is still tending to move the pulley wheel 114 in a clockwise direction and is thereby applying tensioning force on the belt 21 that is engaged by the pulley 114.

Figure 6:
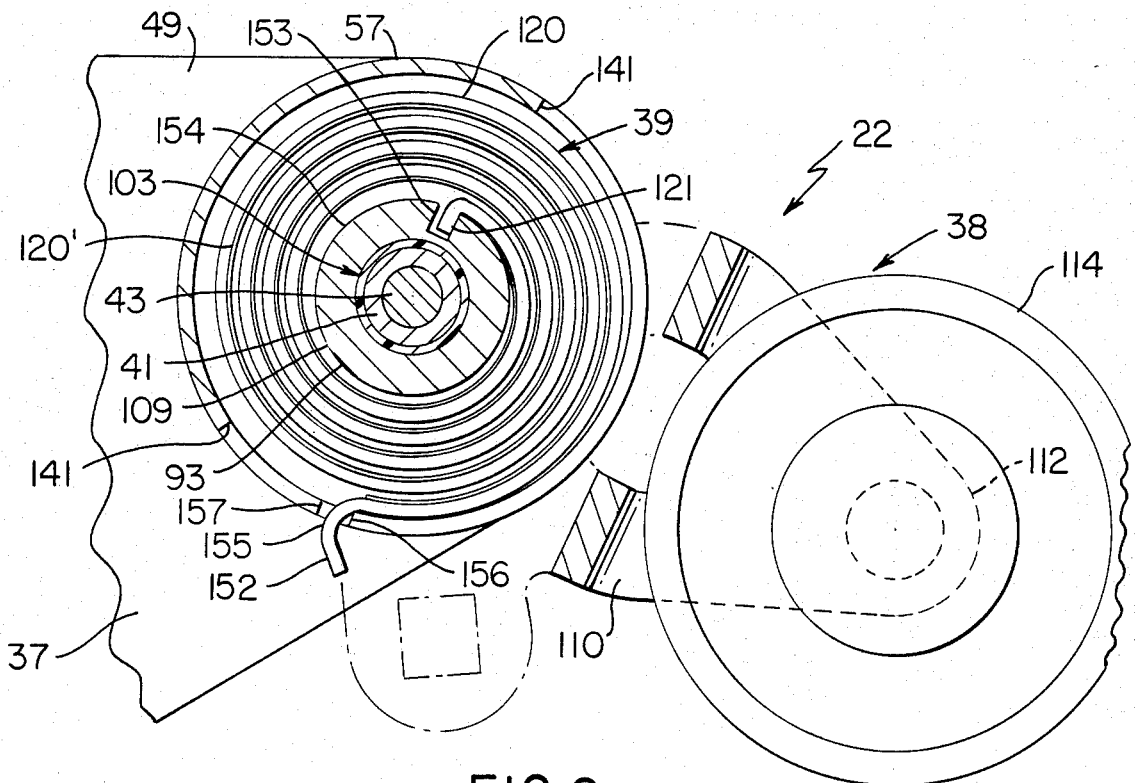
FIG. 6 is a fragmentary cross-sectional view of the tensioner of FIG. 5 and is taken on line 6—6 of FIG. 5.
Figure 12:
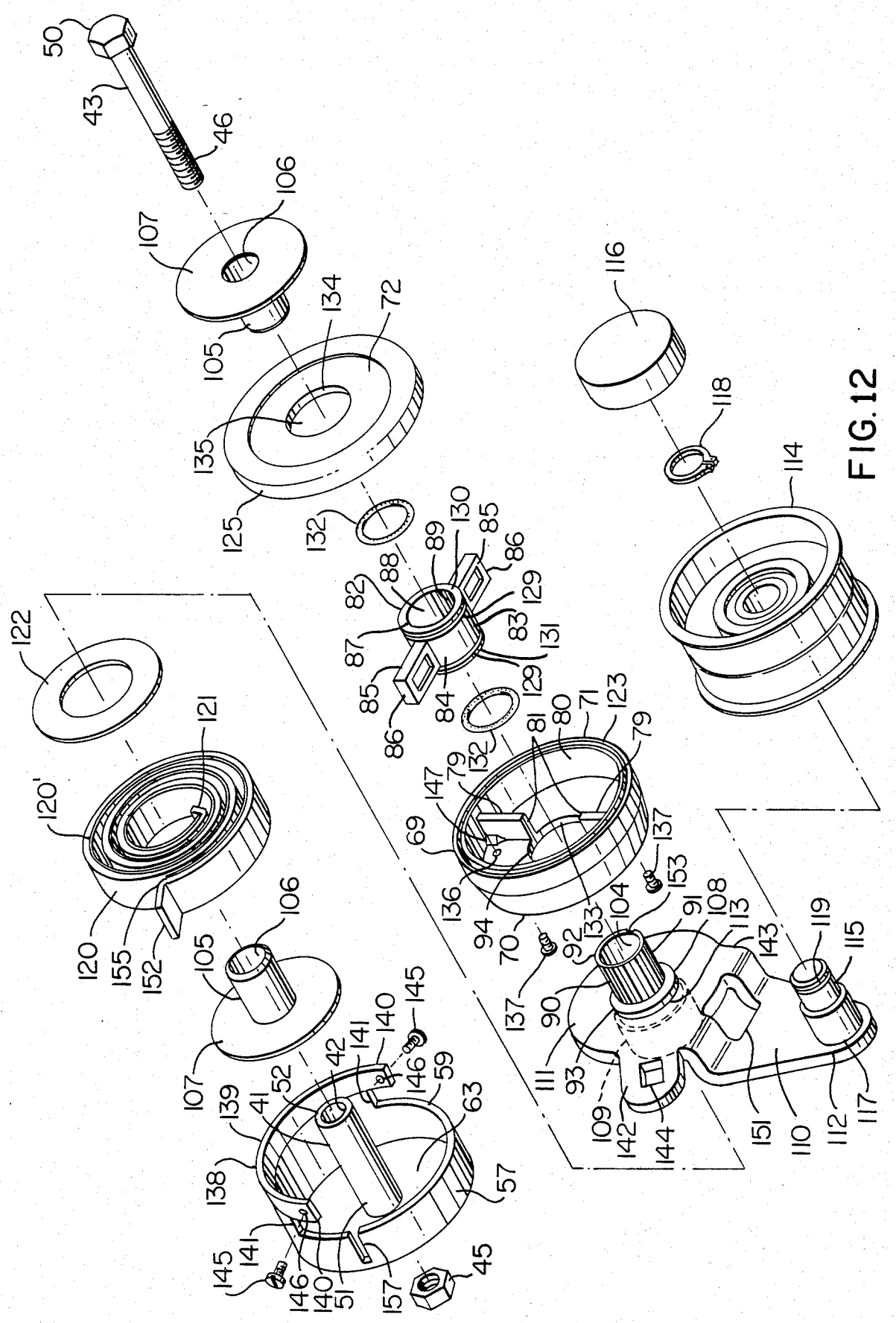
FIG. 12 is an exploded perspective view illustrating the various parts of the belt tensioner of this invention.

In order to facilitate such winding and unwinding movement of the coils of the spring 120, a flexible strip of a suitable anti-friction material 120' can be inserted in the coils of the spring 120 as illustrated in FIGS. 6 and 12.

Also, it can be seen in FIG. 5 that when the member 105 is assembled on the tubular member 41 of the housing 57 so that its disc-like part 107 is against the end wall surface 63, that disc-like member 107 forms an anti-friction bearing surface against which the adjacent side of the coiled spring 120 can move as illustrated in FIG. 5. In addition, a washer-like member 122 of a suitable anti-friction material is disposed on the other side of the coiled spring 120 intermediate the spring 120 and the end 111 of the belt engaging means 38 as illustrated in FIG. 5 so that the spring 120 is protected on both sides thereof by anti-friction material 107 and 122 as well as has the anti-friction strip 120' wound therein whereby it is believed that movement of the coils of the spring 120 during the operation of the tensioner 22 will be facilitated by such anti-friction material.

As previously stated, the cover member 72 for the rotary dampening means 40 is adapted to be ultrasonically welded to the open end 71 of the outer ring member 69 as illustrated in FIGS. 10 and 11.

In particular, it can be seen in FIGS. 10 and 11 that the open end 71 of the outer ring member 69 has an annular channel 123 formed therein and is adapted to receive an annular projection 124 on the cover member 72, the annular projection 124 being concentric to and inboard of an outer annular flange 125 of the cover member 72 that overlaps the outer peripheral surface 126 of the outer ring member 69 as illustrated in FIG. 10.

The outer edge 127 of the inner annular flange 124 of the cover member 72 is shaped in a manner well known in the art to initially be a force direction that engages against the annular flat surface 128 in the annular groove 123 of the outer ring member 69 so as to assist the subsequent ultrasonic welding together of the cover member 72 to the outer ring member 69 at the adjoining parts 124 and 128 thereof as illustrated in FIG. 11 in a manner well known for ultrasonically welding together suitable polymeric materials and the like.

Before the cover member 72 and outer ring member 69 are secured together in the manner previously described, the inner ring member 82 is assembled in the outer ring member 69, the inner ring member 82 having a pair of annular grooves 129 formed in the outer opposed ends 130 and 131 thereof that respectively receive conventional annular sealing O-ring-like members 132 so that the sealing member 132 on the end 131 of the inner ring member 82 will sealingly engage against the internal peripheral surface 133 of the outer ring member 69 that is defined by the central opening 94 in the end wall 70 thereof that is adapted to receive the end 131 as illustrated in FIG. 5. Similarly, the other sealing member 132 on the end 130 of the inner ring member 82 will sealingly engage against the internal peripheral surface 134 of the cover member 72 that is defined by a central opening 135 passing therethrough and being adapted to receive the end 130 of the inner ring member 82 therein as illustrated in FIG. 5.

After the inner ring member 82 has been assembled in the outer ring member 69 and the cover member 72 has been secured to the outer ring member 69 in the manner previously set forth, the resulting chamber 73 in the rotary dampening means 40 is completely sealed except for opening means 136 in the end wall 70 of the outer ring member 69. In this manner, the chamber 73 can be filled with any suitable dampening fluid as such fluid can be injected into the chamber 73 through one of the opening 136 formed through the end wall 70 of the outer ring member 69 while the other opening 136 acts as a vent. The openings 136 can be subsequently closed by having suitable threaded members 137 threadedly disposed therein.

As previously stated, the housing means 57 of the support means 36 of the tensioner 22 of this invention is utilized to secure the outer ring member 69 of the rotary dampening means 40 from rotational movement so that the inner ring member 82 can be moved relative thereto as the belt engaging arm 110 rotates on the stationary tubular member 41 of the support means 36. This unique feature is accomplished by having the open end 59 of the housing means 57 uniquely constructed so that the same has an extension part 138 that defines an arcuate section 139 provided with opposed ends 140 as illustrated, the arcuate section 139 of the extension 138 having the ends 140 thereof extending beyond a pair of shoulders or edges 141 of the extension 138 that defines stop means for limiting pivoting movement of the arm 110 relative to the housing means 57 as illustrated in FIG. 3.

For example, the arm 110 can have an extension 142 which will engage one of the stops 141 when moved thereagainst as illustrated by the lower position of the arm 110 in FIG. 3 while another side 143 of the arm 110 will move against the other stop 141 when the arm 110 is moved thereagainst as illustrated by the upper position of the arm 110 in FIG. 3, the extension 142 of the arm 110 having a suitable opening 144 passing therethrough to receive a tool for facilitating the moving of the arm 110 in opposition to the force of the spring 120 when the tensioner 22 is first mounted to the engine 20 in a manner known in the art.

When the rotary dampening means 40 is initially assembled on the tubular member 41 of the housing means 57, the arcuate section 139 of the extending part 138 of the open end 59 of the housing 57 overlaps the outer peripheral surface 126 of the outer ring member 69 as illustrated in FIGS. 5 and 7 and a pair of threaded fastening means or screws 145 are adapted to respectively pass through suitable opening 146 in the respective ends 140 of the arcuate section 139 and be threaded into the outer ring member 69 at respective thickened parts 147 of the vanes 79 adjacent the end wall 70 where the vanes 79 integrally join the end wall 70 as illustrated in FIGS. 7 and 12. The screws 145 can be self-tapping into the outer ring member 69 or the outer ring member can be provided with threaded or unthreaded openings (not shown) for receiving the screws 145 as desired.

In this manner, the extending part 138 of the housing means 57 extends over and is directly secured to the rotary dampening means 40 at the outer ring member 69 thereof to hold the outer ring member 69 from rotating relative to the support means 36 so that the inner ring member 82 can rotate relative thereto by the belt engaging arm 110 in a manner hereinafter set forth.

If desired, the outer peripheral surface 126 of the outer ring member 69 can taper toward the end wall 70 thereof and the arcuate section 139 can be angled outwardly to be complementary thereto as illustrated in FIG. 5 so as to facilitate the insertion of the rotary dampening means 40 into the extending part 138 of the housing means 57 during the initial assembly of the rotary dampening means 40 onto the tubular member 41 of the housing means 57.

When the rotary dampening means 40 is being assembled on the tubular member 41 as previously described, the inner ring member 82 is being telescoped onto the ribbed section 90 of the arbor 93 so as to mesh the ribs 89 thereof to the ribs 90 to interconnect the inner ring member 82 to the arbor 93. Also, when the rotary dampening means 40 is fastened to the part 138 of the housing means 57, the arm 110 is free to move relative to the end wall 70 of the outer ring member 69 as sufficient clearance is provided for this purpose. However, it can be seen that the anti-friction washer 122 and the end wall 70 of the dampening means 40 also provide anti-friction surfaces on opposite sides of the arm 110 to facilitate such movement, if desired.

As illustrated in FIG. 5, arm 110 of the belt engaging means 38 can be provided with an offset section 148 so as to permit the end 112 with its pulley 114 to be disposed in alignment with the rotary dampening means 40 and housing 57 so that the side 149 of the arm end 112 and the outer side 150 of the pulley 114 will be respectively disposed within the parallel planes of the outer surface 61 of the housing member 57 and the disc-like member 107 that is disposed against the cover 72 as illustrated in FIG. 5 so that the tensioner 22 will be relatively small and compact. In order to facilitate forming the offset 148 in the arm 110, a suitable opening 151 can be formed through the arm 110 as illustrated.

While the various parts of the tensioner 22 of this invention previously described can be made of any suitable material, the arm 110, arbor sleeve 93, housing means 57 and its tubular member 41 can be formed from metallic material as illustrated in the drawings while the outer ring member 69 and inner ring member 82 can be formed from suitable polymeric material. The spring 120 can be formed from a suitable spring metal and the anti-friction members 120' and 105 can be formed from suitable polymeric material or materials.

Accordingly, it can be seen that it is a relatively simple matter to make the tensioner 22 of this invention by the method of this invention previously described from the various parts thereof to operate in a manner now to be described.

When it is desired to mount the tensioner 22 of this invention to the engine 20, the tensioner 22 is placed adjacent the bracket 37 with the spring means 39 having the arm 110 in such a position that the pulley 114 is disposed in a position that the arm 110 will have to be rotated in a counterclockwise direction in FIG. 3 in order to place the pulley 114 on the belt 21. The tensioner 22 is so disposed against the bracket 37 that the projection 64 of the housing 57 is received in the opening 65 in the bracket 37. At this time, the fastening member or bolt 43 is inserted through the opening 42 in the tubular member 41 to project through the opening 44 in the bracket 37 and have the nut 45 threaded on the threaded end 46 thereof to compact the tensioner 22 between the head 50 of the bolt 43 and the side 49 of the bracket 37 in the manner previously described so that the support means 36 of the tensioner 22 is fixed to the bracket 37 and thereby fixed relative to the belt 21.

Thereafter, the pulley 114 and arm 110 are rotated in a counterclockwise direction in FIG. 3 so as to place the pulley 114 onto the belt 21 as illustrated in FIGS. 1 and 2 and as illustrated by the intermediate full line position in FIG. 3 so that the torsion spring 120 is wound up and is tending to urge the pulley 114 in a clockwise direction against the belt 21, such adjustment of the pulley 114 onto the belt 21 being facilitated by a suitable tool being inserted into a rectangular opening 144 formed in the extension 142 of the arm 110 so that the arm 110 can be rotated to place the pulley 114 onto the belt 21 in opposition to the force of the torsion spring 120.

Accordingly, in all operating positions of the arm 110 of the belt engaging means 38 as represented by the full lines and phantom lines in FIG. 3 of the drawings, the torsion spring 120 has a force tending to move the belt engaging means 38 in a clockwise direction beyond even the lowest position illustrted in FIG. 3 so as to always provide a tensioning force on the belt 21.

Thus, assuming that the belt engaging means 38 is in the full line position illustrated in FIG. 3 against the belt 21 and a normal oscillation of the belt 21 during the operation of the engine 20 for the reasons previously set forth causes the belt engaging means 38 to move further inwardly toward the belt 21 in a clockwise direction in FIG. 3, such clockwise movement of the arm 110 causes the arbor sleeve 93 and, thus, the inner ring member 82 of the fluid dampening means 40 to rotate in a clockwise direction in FIG. 7 whereby the action of the vanes 85 and 79 on the fluid 98 in the chamber 73 of the rotary dampening means 40 tends to retard such rotary movement of the inner ring member 82 relative to the stationary outer ring member 69 for the reasons previously described so as to dampen the movement of the belt engaging means 38 toward the belt 21. Conversely, should the fluctuation of the belt 21 cause the belt engaging means 38 to move in a counterclockwise direction away from the belt 21 as illustrated in FIG. 3, such movement of the arm 110 causes the inner ring member 82 of the rotary dampening means 40 to move in a counterclockwise direction in FIG. 7 whereby the fluid 98 in the chamber 73 of the rotary dampening means 40 tends to retard such movement of the inner ring member 82 so as to dampen such oscillation of the belt 21 for the reasons previously set forth.

Therefore, it can be seen that the tensioner 22 provides for fluid dampening of the movement of the belt engaging means 38 relative to the support means 36 so as to tend to prevent early wearout of the mechanical spring means 39 that is operatively interconnected to the support means 36 and the belt engaging means 38 for the reasons previously set forth.

Also, it can be seen that since the rotary dampening means 40 and mechanical spring means 39 of the tensioner 22 of this invention are coaxially aligned, the same render the tensioner 22 substantially small and compact while still permitting the single fastening member 43 to secure the tensioner 22 to the bracket 37 in the manner previously set forth.

Thus, it can be seen that this invention not only provides an improved belt tensioner, but also this invention provides an improved method of making such a belt tensioner.

While the forms and methods of this invention now preferred have been illustrated and described as required by the Patent Statute, it is to be understood that other forms and method steps can be utilized and still fall within the scope of the appended claims.

What is claimed is:

1. In a tensioner for a power transmission belt that is adapted to be operated in an endless path, said tensioner comprising a support means for being fixed relative to said belt, a belt engaging means carried by said support means and being movable relative thereto, mechanical spring means operatively associated with said support means and said belt engaging means for urging said belt engaging means relative to said support means and against said belt with a force to tension said belt, and fluid dampening means operatively associated with said support means and said belt engaging means to dampen the movement of said belt engaging means relative to said support means in at least one direction of movement thereof, said fluid dampening means comprising a rotary dampening means, said rotary dampening means and said spring means being coaxially aligned, said rotary dampening means comprising an outer ring member and an inner ring member disposed in said outer ring member, said members being arranged for relative rotational movement therebetween, said outer ring member being operatively interconnected to said support means, said inner ring member being operatively interconnected to said belt engaging means, said support means comprising a cup-shaped housing means containing said spring means therein and having a closed end means and an open end means, said housing means being operatively interconnected to said outer ring member, the improvement wherein part of said open end means of said housing means extends over said outer ring member and is secured thereto.

2. A tensioner as set forth in claim 1 wherein said part of said open end means of said housing means defines an arcuate section having opposed spaced apart ends.

3. A tensioner as set forth in claim 2 and including fastening means securing said arcuate section of said housing means to said outer ring member at points that are disposed substantially diametrically from each other on said outer ring member 4. A tensioner as set forth in claim 1 wherein said open end means of said housing means defines a pair of spaced apart stop means, said belt engaging means being engageable with said stop means so as to limit movement thereof relative to said support means.

5. A tensioner as set forth in claim 1 wherein said support means has an opening means passing therethrough for receiving a fastening member that will fasten said support means to a bracket or the like, said opening means being disposed coaxially through said rotary dampening means and said spring means.

6. A tensioner as set forth in claim 5 wherein said support means comprises a tubular member disposed coaxially through said rotary dampening means and said spring means, said tubular member having opposed open ends whereby said tubular member defines said opening means that passes completely therethrough, one of said open ends of said tubular member being secured to said closed end means of said housing means.

7. A tensioner as set forth in claim 6 wherein a sleeve means is rotatably disposed on said tubular member, said inner ring member being operatively interconnected to said sleeve means to rotate in unison therewith relative to said tubular member whereby said inner ring member is also rotatably disposed on said tubular member.

8. A tensioner as set forth in claim 7 wherein said belt engaging means comprises an arm having opposed ends, one of said opposed ends of said arm being interconnected to said sleeve means to rotate in unison therewith, said belt engaging means further comprising a pulley for engaging said belt, said pulley being rotatably carried by the other of said opposed ends of said arm.

9. A tensioner as set forth in claim 8 wherein said spring means comprises a coiled torsion spring having an inner end and an outer end, said inner end of said spring being operatively interconnected to said sleeve means and, thus, to said inner ring member of said rotary dampening means and said outer end of said spring being operatively interconnected to said housing means.

10. In the combination of a vehicle having a bracket means and a tensioner for a power transmission belt of said vehicle that is adapted to be operated in an endless path and drive a plurality of accessories of said vehicle, said tensioner comprising a support means secured to said bracket means so as to be fixed relative to said belt, a belt engaging means carried by said support means and being movable relative thereto, mechanical spring means operatively associated with said support means and said belt engaging means for urging said belt engaging means relative to said support means and against said belt with a force to tension said belt, and fluid dampening means operatively associated with said support means and said belt engaging means to dampen the movement of said belt engaging means relative to said support means in at least one direction of movement thereof, said fluid dampening means comprising a rotary dampening means, said rotary dampening means and said spring means being coaxially aligned, said rotary dampening means comprising an outer ring member and an inner ring member disposed in said outer ring member, said members being arranged for relative rotational movement therebetween, said outer ring member being operatively interconnected to said support means, said inner ring member being operatively interconnected to said belt engaging means, said support means comprising a cup-shaped housing means containing said spring means therein and having a closed end means and an open end means, said housing means being operatively interconnected to said outer ring member, the improvement wherein part of said open end means of said housing means extends over said outer ring member and is secured thereto.

11. A combination as set forth in claim 10 wherein said support means has an opening means passing therethrough, and a fastening member disposed in said opening means and fastening said tensioner to said bracket means, said opening means being disposed coaxially through said rotary dampening means and said spring means.

12. In a method of making a tensioner for a power transmission belt that is adapted to be operated in an endless path, said method comprising the steps of providing a support means for being fixed relative to said belt, providing a belt engaging means to be carried by said support means and be movable relative thereto, operatively associating mechanical spring means with said support means and said belt engaging means for urging said belt engaging means relative to said support means and against said belt with a force to tension said belt, and operatively associating fluid dampening means with said support means and said belt engaging means to dampen the movement of said belt engaging means relative to said support means in at least one direction of movement thereof, forming said fluid dampening means to comprise a rotary dampening means, disposing said rotary dampening means and said spring means to be coaxially aligned, forming said rotary dampening means to comprise an outer ring member and an inner ring member disposed in said outer ring member, arranging said members for relative rotational movement therebetween, operatively interconnecting said outer ring member to said support means, operatively interconnecting said inner ring member to said belt engaging means, forming said support means to comprise a cup-shaped housing means containing said spring means therein and having a closed end means and an open end means, and operatively interconnecting said housing means to said outer ring member, the improvement comprising the steps of extending part of said open end means of said housing means over said outer ring member, and securing said part to said outer ring member.

13. A method of making a tensioner as set forth in claim 12 and including the step of forming said part of said open end means of said housing means to define an arcuate section having opposed spaced apart ends.

14. A method of making a tensioner as set forth in claim 13 wherein said step of securing comprises the step of securing said arcuate section of said housing means to said outer ring member which fastening means at points that are disposed substantially diametrically from each other on said outer ring member.

15. A method of making a tensioner a set forth in claim 12 and including the steps of forming said open end means of said housing means to define a pair of spaced apart stop means, and forming said belt engaging means to be engageable with said stop means so as to limit movement thereof relative to said support means.

16. A method of making a tensioner as set forth in claim 12 and including the steps of forming said support means to have an opening means passing therethrough for receiving a fastening member that will fasten said support means to a bracket or the like, and forming said opening means to be disposed coaxially through said rotary dampening means and said spring means.

17. A method of making a tensioner as set forth in claim 16 and including the steps of forming said support means to comprise a tubular member disposed coaxially through said rotary dampening means and said spring means, forming said tubular member to have opposed open ends whereby said tubular member defines said opening means that passes completely therethrough, and securing one of said open ends of said tubular member to said closed end means of said housing means.

18. A method of making a tensioner as set forth in claim 17 and including the steps of rotatably disposing a sleeve means on said tubular member, and operatively interconnecting said inner ring member to said sleeve means to rotate in unison therewith relative to said tubular member whereby said inner ring member is also rotatably disposed on said tubular member.

19. A method of making a tensioner as set forth in claim 18 and including the steps of forming said belt engaging means to comprise an arm having opposed ends, interconnecting one of said opposed ends of said arm to said sleeve means to rotate in unison therewith, forming said belt engaging means to further comprise a pulley for engaging said belt, and rotatably disposing said pulley on the other of said opposed ends of said arm.

20. A method of making a tensioner as set forth in claim 19 and including the steps of forming said spring means to comprise a coiled torsion spring having an inner end and an outer end, operatively interconnecting said inner end of said spring to said sleeve means and, thus, to said inner ring member of said rotary dampening means, and operatively interconnecting said outer end of said spring to said housing means.

* * * * *